Dec. 8, 1925.  1,564,755
T. R. CLARK
COMBINATION BLOWTORCH, SOLDERING AND BRANDING-IRON
Filed Feb. 13, 1925
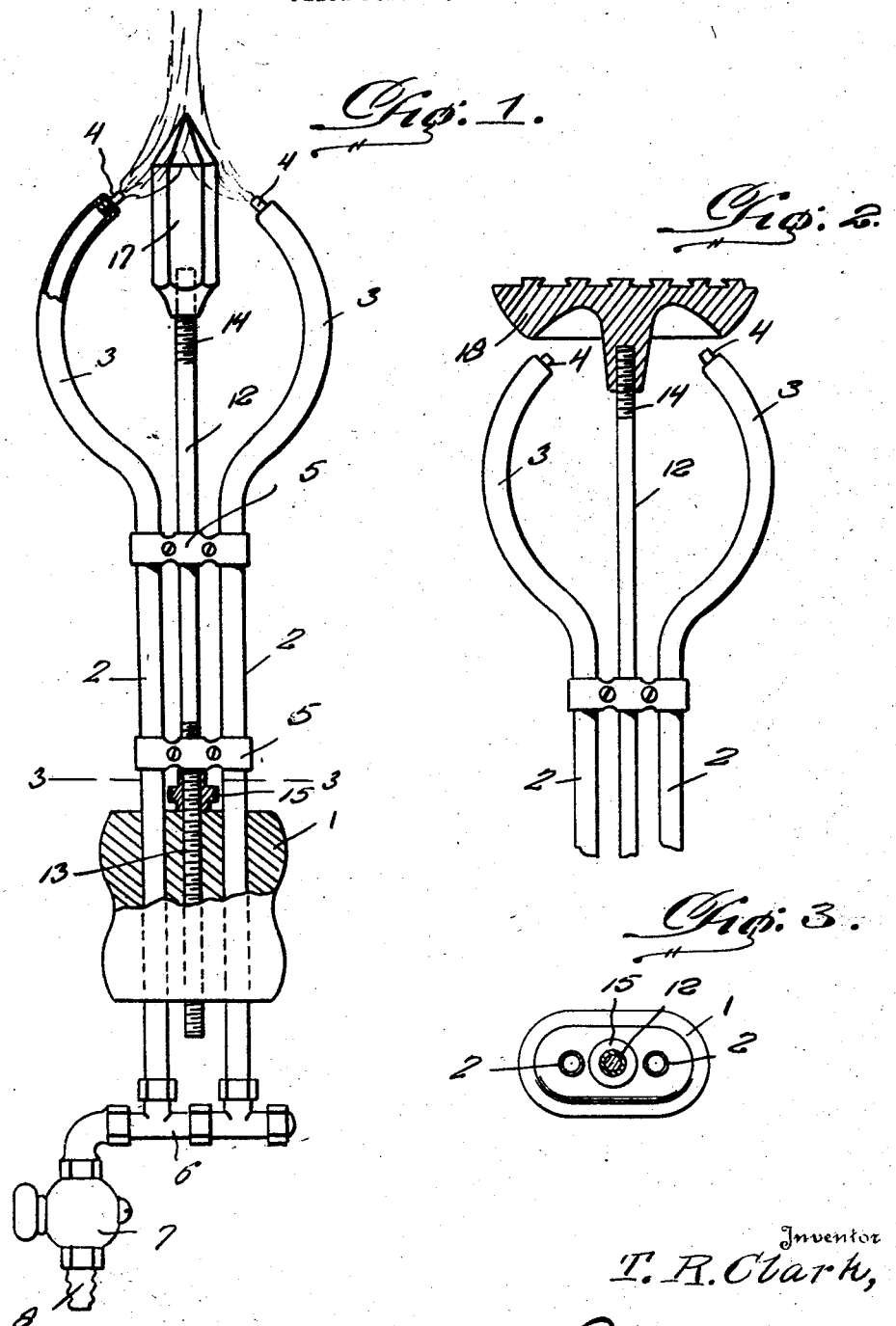
Inventor
T. R. Clark,
Attorney Patented Dec. 8, 1925.

1,564,755

UNITED STATES PATENT OFFICE.

THOMAS RAYMOND CLARK, OF CHICAGO, ILLINOIS.

COMBINATION BLOWTORCH, SOLDERING AND BRANDING IRON.

Application filed February 13, 1925. Serial No. 9,023.

*To all whom it may concern:*

Be it known that I, THOMAS R. CLARK, a citizen of the United States, residing at Chicago, in the county of Cook and State of Illinois, have invented certain new and useful Improvements in a Combination Blowtorch, Soldering and Branding Iron, of which the following is a specification.

The present invention relates to a blow torch having an iron supporting member adjustably incorporated therein so that it may be moved in relation to the plane of the torch as may be necessary and desirable.

Another very important object of the invention is to incorporate in a blow torch structure an adjustable spindle adjusted to receive an iron so as to adjust the same between two planes in order that said planes may be directed most efficiently on the iron carried by the spindle.

A still further important object of the invention is to provide a combination device of this nature which is both simple and reliable, one which may be manufactured at a comparatively low cost, and one which is strong, durable, not likely to easily become out of order, and well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing—

Figure 1 is an elevation of the device embodying the features of my invention, showing portions in section and a soldering iron associated therewith, Fig. 2 is a fragmentary view showing the plane end of the torch with a branding iron associated therewith, and Fig. 3 is a transverse section taken substantially on the line 3—3, of Fig. 1 looking downwardly.

Referring to the drawing in detail, it will be seen that 1 designates a handle which should be of such a size as to be conveniently and firmly grasped by the hand. This handle is formed of wood or some other heat insulating material. A pair of pipes 2 project through the handle 1 in spaced parallel relationship and have their ends accurately curved as at 3.

The terminals of these curved ends 3 are provided with burner jets 4 in order to direct flames toward each other as is indicated to advantage in Fig. 1. A pair of clamps 5 are associated with the pipes 2. A supply pipe of suitable construction as shown at 6 is connected to the other ends of the pipes 2 and has a pet cock or other suitable valve 7 incorporated therein with an extension 8 in order that a flexible hose may be connected thereto.

A spindle 12 is slidably mounted through the clamps 5 and the handle 1 between the pipes 2 and has its ends threaded as at 13 and 14. A nut 15 is engaged with the threaded portion 13 and is positioned between the handle and the adjacent clamp 5 so that when this nut is turned the spindle moves longitudinally of the pipes 2 whereby its threaded end 14 may be distanced from the jets 4 as may be desired.

Various sorts of irons may be attached to the threaded end 14. In Figure 1 I have shown a soldering iron head 17 engaged with the threaded end 14. By turning the nut 15 it will be seen that this soldering iron head 17 may be adjusted so that the nose thereof is engaged directly by the flames shooting out of the jets 4. In Figure 2 I have shown a branding iron head 18 on the threaded end 14 of the spindle 12, and this head 18 may be likewise adjusted by operation of the nut 15 so that the flames may be properly directed thereto preferably on the bottom thereof as is indicated in Fig. 2. It is evident that other irons may be utilized with the spindle in order to be heated by the flames shooting from the jets 4.

It will be apparent that with this device it is possible to adjust the iron being heated so that the flames are concentrated on points where the flames will be most effective and efficient. It will also be apparent that the structure of the device is simple, strong, durable, and is such as may be easily and quickly adjustable as may be desired.

The present embodiment of the invention which I have described in detail has been given merely by way of example and it is desired to point out that numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. In combination, a pair of pipes, means for holding the pipes in spaced parallel relationship, burner jets in the ends of said pipes, means for connecting the pipes to a fuel supply source, a spindle disposed between the pipes and adapted to support an iron, and means associated with the spindle whereby it may be moved longitudinally of the pipes so as to vary the distance between the end of the spindle and the jets.

2. In combination, a handle, a pair of spaced parallel pipes extending through the handle, a clamp connecting the pipes, the ends of said pipes being curved arcuately, jets in the terminals of the curved ends, a spindle slidable through the handle and the bracket, a nut threaded on the spindle and disposed between the handle and the bracket whereby said spindle may be moved longitudinally of the pipes, said spindle being adapted for holding an iron head.

3. In a device of the class described, a handle of heat insulating material, a pair of parallel spaced pipes extending through the handle, a supply pipe extending transversely of the adjacent ends of said pipes, a valve in said supply pipe, a nipple on said valve whereby the same may be attached to a flexible hose leading from a fuel supply source, the other ends of first pipes being curved arcuately and having jets in their terminals directed so that flames shooting therefrom will cross each other, a spindle slidable through the handle, a clamp between the first mentioned pipes, said spindle passing through said clamp, a nut threaded on the spindle between the handle and the clamp, the end of said spindle adjacent the jets being threaded for receiving an iron head.

4. In combination, a pair of pipes, means for holding the pipes in spaced relation, burner jets in the pipes, means for connecting the pipes to a fuel supply source, a spindle disposed between the pipes and adapted to support an iron, and means associated with the spindle whereby it may be adjusted so as to regulate the distance between an iron supported thereon, and the jets in the pipes.

In testimony whereof I affix my signature.

THOMAS RAYMOND CLARK.